United States Patent [19]

Matuo et al.

[11] Patent Number: 5,611,258
[45] Date of Patent: Mar. 18, 1997

[54] VACUUM BOOSTER

[75] Inventors: Akira Matuo; Takeshi Kaneko, both of Yokohama, Japan

[73] Assignee: Nabco Limited, Kobe, Japan

[21] Appl. No.: 610,609

[22] Filed: Mar. 8, 1996

[30] Foreign Application Priority Data

Mar. 25, 1995 [JP] Japan .................... 7-091732

[51] Int. Cl.⁶ ................................... F15B 9/10
[52] U.S. Cl. ....................................... 91/376 R
[58] Field of Search ............................ 91/376 R

[56] References Cited

U.S. PATENT DOCUMENTS

| 3,548,718 | 12/1970 | Utton ........................... 91/376 R |
| 4,005,638 | 2/1977 | Takeuchi ........................ 91/376 R |
| 5,263,399 | 11/1993 | Flory et al. ................... 91/376 R |

FOREIGN PATENT DOCUMENTS

| 414353A1 | 6/1993 | Germany . |
| 5069582 | 10/1982 | Japan . |
| 2054777 | 2/1981 | United Kingdom . |
| WO9400325 | 1/1994 | WIPO . |

Primary Examiner—F. Daniel Lopez
Attorney, Agent, or Firm—Kane, Dalsimer, Sullivan, Kurucz, Levy, Eisele and Richard, LLP

[57] ABSTRACT

A brake booster having separately formed valve bodies for the vacuum valve and the atmospheric valve, which minimizes an invalid portion of the operation stroke. There is provided a cylindrical inner member 800 air-tightly and slidably fitted in the internal bore of a hub portion 52 of a servo piston 50. The inner member 800 is biased backwardly by a spring 850. The inner member 800 has at its front end a valve body 510 of the vacuum valve 500. The rear end of the inner member 800 is caused to be abutted with the atmospheric air valve body 710 side of the atmospheric air valve 700 under the effect of force of the spring 850.

10 Claims, 3 Drawing Sheets

VACUUM BOOSTER

BACKGROUND OF THE INVENTION

This invention relates to a vacuum booster applicable to a brake unit of automotive vehicles and the like, for assisting an operator to operate a brake pedal, and more particularly to a vacuum booster of the type in which a valve body of a vacuum valve and a valve body of an atmospheric air valve are separately formed.

In general, a vacuum booster has a casing, a servo piston located within the casing, an input member disposed in a rearward position of the servo piston, and an output member disposed in a forward position of the servo piston. The servo piston is adapted to boost an operating force applied to the input member and exerts the same to output member. The interior of the casing is divided into a vacuum chamber on the forward side and a pressure-variable chamber on the rearward side by the servo piston. The boosting action is caused by a force corresponding to a pressure difference between those two chambers.

For the purpose of obtaining such a boosting action as just mentioned, the vacuum booster includes, as a control valve unit, a vacuum valve for allowing and cutting off a communication between the vacuum chamber and the pressure-variable chamber and an atmospheric air valve for cutting off and allowing a communication between the pressure-variable chamber and the atmospheric air. The valve bodies of those two valves are customarily integrally provided; for example, the vacuum valve body and the atmospheric air valve body are concentrically arranged on an outer periphery portion and an inner periphery portion of the same valve body (see, for example, U.S. Pat. No. 3,559,406 and Japanese Utility Model Publication No. 21744/92).

On the other hand, there is known an idea in which a valve body of a vacuum valve and a valve body of an atmospheric air valve are separately provided, in other words, the valve bodies are formed of separate members with each other, so that the valve bodies can be supported in a more stable manner and the opening and closing operation of the valves can more reliably be performed. The technique disclosed by Japanese Patent Publication No. 50695/82 is based on this idea. According to this idea, a valve body, which is supported by an inner periphery of an internal bore in a hub portion of a servo piston, serves as an atmospheric air valve, the valve body can sit on and leave away from an atmospheric air valve seat formed on a rear end of a valve plunger, a valve body slidably installed on an outer periphery of a valve plunger serves as a vacuum valve body so that they can sit on and leave away from a vacuum valve seat formed on an internal bore side of the hub portion.

The technique disclosed by the above Japanese Patent Publication No. 50695/82 indeed has the advantage that the valves can be opened and closed in a reliable manner owing to its structural feature of the valve bodies being separately provided but it also has the following shortcomings.

① The above-mentioned technique employs an arrangement in which a stopper ring is provided on an outer periphery of the valve plunger as a means for allowing a communication (opening) of the vacuum valve when in an inoperable position so that the position of the vacuum valve body is restricted by the stopper ring, and in addition, a stopper member integral with the vacuum valve body is utilized as a means for causing the atmospheric air valve body to leave away from the atmospheric air valve seat when in an operating state. Accordingly, it becomes necessary that a clearance is provided between the stopper member and the atmospheric air valve body in order to prevent a possible inadvertent opening of the atmospheric air valve when in an inoperative position. This clearance tends to increase invalid stroke when in an operating state.

② Since the vacuum valve body slidingly moves on the outer periphery of the valve plunger through a seal portion, a sliding resistance acts constantly thereon to thereby produce an output loss.

③ Since the vacuum valve body is mounted on the outer periphery of the valve plunger, the atmospheric air valve cannot be enlarged in diameter. Accordingly, a passage for allowing the atmospheric air to flow therein cannot be formed large in size and therefore, responsibility cannot be enhanced when in an operating state.

SUMMARY OF THE INVENTION

It is, therefore, an object of the present invention to provide a technique capable of improving the above-mentioned shortcomings ① through ③ while effectively utilizing the advantages available in the type in which a valve body of a vacuum valve and a valve body of an atmospheric air valve are separately formed.

In other words, the object of the present invention is to provide a technique which is effective in minimizing invalid stroke when in an operating state, reducing loss of an output and enhancing responsibility when in an operating state.

The above-mentioned shortcomings are all attributable to the fact that a vacuum valve body is mounted on the outer periphery of the valve plunger. In view of the foregoing, according to the teaching of the present invention, a vacuum valve body is installed on the inner periphery side of an internal bore in a hub portion of a servo piston instead of being mounted on a valve plunger. As shown in FIGS. 1 and 2 which illustrate one embodiment of the present invention, the present invention has the following features (B) through (E) in addition to the feature (A) in which the valve bodies are separately provided or formed.

(A) A valve body of an atmospheric air valve 700 and a valve body of a vacuum valve 500 are formed of separate members, respectively.

(B) The atmospheric air valve 700 comprises an atmospheric air valve body 710 which is supported at one end portion thereof by an inner periphery side of the internal bore in a hub portion 52 of a servo piston 50 and which is subjected at the other end to a spring force directing from an input member 200 side to an output member 300 side, and an atmospheric air valve seat 780 disposed on an inner end portion of the input member 200.

(C) There is a provision of a cylindrical inner member 800 which is air-tightly and slidably fitted in an internal bore of the hub portion 52.

(D) The vacuum valve 500 comprises a vacuum valve body 510 disposed on a front end of the inner member 800 and a vacuum valve seat 580 disposed on the internal bore side of the hub portion 52.

(E) The inner member 800 is under the effect of a spring force directing from the output member 300 side towards the input member 200 side and a rear end thereof is in abutment with the atmospheric air valve body 714 (710) of the atmospheric air valve.

The input member 200 is usually comprised of an input rod 210 subjected to an operating force, and a valve plunger 220 jointed to its front end. It is preferred that an outwardly faced flange 223 is disposed on a rear end of the valve plunger 220 and an outer peripheral portion of the outwardly-faced flange serves as the atmospheric air valve seat 780. The reason is that responsibility, when in an operating state, can be enhanced by enlarging the atmospheric air valve seat (i.e., diameter of the atmospheric air valve seat).

Since the inner member 800 including the vacuum valve body 510 is normally abutted against the atmospheric air valve body 714 side by a spring 850, no clearance exists between the two valve bodies and invalid stroke can be minimized to that extent when in an operating state. Moreover, since an air-tight sealing is provided between the inner member 800 and the internal bore in the hub portion 52, the inner member 800 does not slidingly move after the vacuum valve 500 has been closed and therefore, no sliding resistance occurs. Thus, no output loss occurs, either. In order to reduce the sliding resistance and to ensure a smooth operation of the valve, it is preferred that a cup seal 880 having a smaller sliding resistance compared with other seal rings such as O-ring, etc., is used as a seal member for air-tightly sealing the space between the inner member 800 and the internal bore in the hub portion 52.

In case a plurality of slits for allowing a communication between the outside and the inside of the cylindrical inner member 800 are provided in order to obtain a passage for allowing the atmospheric air to flow therein, such slits are preferred to be in the form of closed bores rather than in the form of rearwardly opened cut-outs. The reason is that the circumferential continuation of the rear end face of the inner member will admit less damage to the atmospheric air valve.

It should be noted that the present invention is applicable not only to an ordinary single type vacuum booster having a single pressure receiving portion but also to a tandem type vacuum booster having two pressure receiving portions.

DETAILED DESCRIPTION OF THE PREFERRED EMBODIMENT

Figure 1:
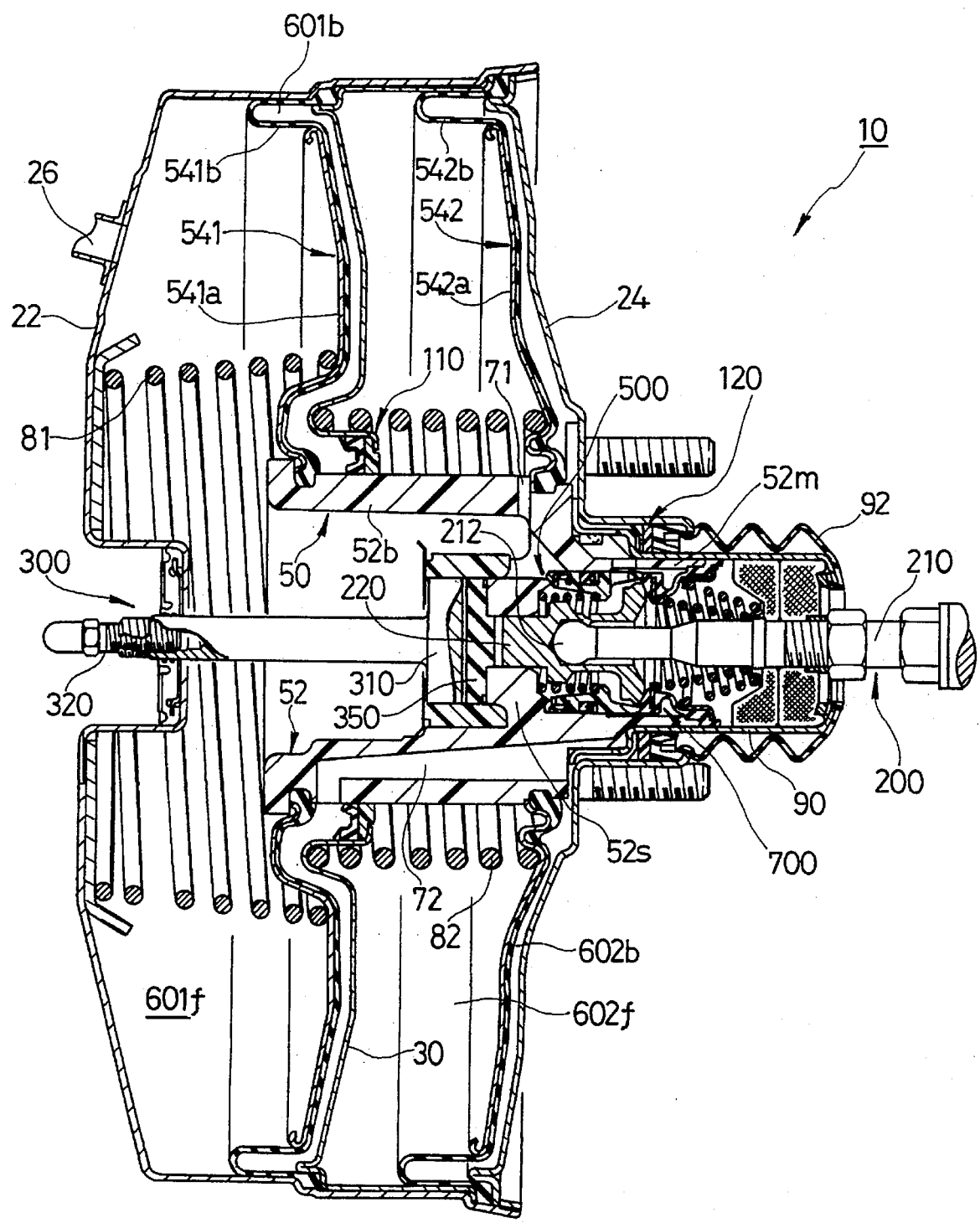
FIG. 1 is a view showing an overall sectional construction of a tandem type vacuum booster according to one embodiment of the present invention.

One embodiment of the present invention will now be described with reference chiefly to FIGS. 1 and 2.

A vacuum booster 10 herein illustrated is of a tandem type which includes a forward wall 22 and a rearward wall 24 located respectively in the external positions, and a doughnut type partition wall 30 formed within an internal bore which is defined by and between the walls 22 and 24. The forward wall 22 and the rearward wall 24 are located in positions away with each other in the axial direction and constitute an external casing. On the other hand, the internal partition wall 30 is adapted to divide the internal bore into two sections. There is provided a servo piston 50 installed within one such internal cavity. The servo piston 50 includes a cylindrical hub portion 52 along an axis thereof and two pressure receiving portions 541 and 532 extending in a perpendicular direction with respect to the axis. The pressure receiving portions 541 and 542 are arranged such that the partition wall 30 is sandwiched by them. The pressure receiving portions 541 and 542 are comprised of dish-like metal plates 541a and 542a and rubber diaphragms 541b and 542b, respectively. The metal plates 541a and 542a are adapted to support the rubber diaphragms, respectively. Bead portions on the inner periphery side of the diaphragms 541b and 542b are supported by the hub portion 52 of the servo piston 50 and bead portions on the outer periphery side are supported by the external casing. The internal bore divided into two sections by the partition wall 30 are further divided by the servo piston 50 into chambers 601f, 601b, 602f and 602b, the first two chambers 601f and 601b being located in a forward and a rearward position of the pressure receiving portion 541, and the remaining two chambers 602f and 602b in a forward and a rearward position of the pressure receiving portion 542, respectively. The forward chambers 601f and 602f serve as vacuum chambers, and the rearward chambers 601d and 602d as pressure-variable chambers, respectively. The vacuum chamber 601f is communicated with a vacuum source such as an intake manifold of an engine, etc., through a piping connecting portion 26, so that the chamber 601f is normally held in an evacuated state. The forward vacuum chamber 601f is communicated with the rearward vacuum chamber 602f through a first passage 71 which is formed within the hub portion 52. On the other hand, the two pressure-variable chambers 601b and 602b are communicated with each other through a second passage 72 which is formed within the hub portion 52. These chambers 601b and 602b are communicatable selectively with the vacuum chamber or the atmospheric air. The pressure receiving portions 541 and 542 are biased backwardly by coil springs 81 and 82, respectively. The coil springs 81 and 82 are adapted to apply return force respectively to the metal plates 541a and 542a while supporting the metal plates 541a and 542a.

Next, attention should be paid to the cylindrical hub portion 52 at the center of the servo piston 50. The hub portion 52 is a plastic molded product, in which there are arranged an enlarged diameter portion 52b on the forward side, an intermediate diameter portion 52m on the rearward side, and a reduced diameter portion 52s within the enlarged diameter portion 52b, all integrally formed. A metal cylindrical member 90 is fitted to an outer periphery of the intermediate diameter portion 52m. The cylindrical member 90 projects backwardly from the rearward wall 24 of the casing and its outer periphery is covered with a rubber boot 92.

The hub portion 52 fitted to the cylindrical member 90 can be moved in an axial direction while being guided by a first guide portion 110 on an inner periphery of the partition wall 30 and by a second guide portion 120 on the outer periphery of the cylindrical member 90.

An input member 200 extending through the rearward wall 24 and an output member 300 extending through the forward wall 22 are coaxially arranged on the central portion of the hub portion 52. The input member 200 is comprised of an input rod 210 and a valve plunger 220 jointed to a front end of the input rod 210 by a ball joint 212. The input rod 210 projects rearwardly from the inside of the casing so that a rear end of the rod 210 is subjected to pedal pressing force (operating force) applied thereto. The output member 300 is provided at its rear end, which rear end is faced with the valve plunger 220, with a disk portion 310 and at its front end side with a bolt member 320. There is provided a rubber disk 350 which is located among the disk portion 310 and the valve plunger 220 of the output member 300 and the reduced diameter portion 52s of the hub portion 52. Because of this arrangement, the operating force applied to the input member 200 and the force from the servo piston 50 are applied to the output member 300 side through the rubber disk 350. The force applied to the output member 300 urges the piston of a master cylinder, not shown, through the bolt member 320 at the distal end.

There are provided within the internal bore of the hub portion 52 a vacuum valve 500 adapted to allow and cut off a communication between the vacuum chambers 601f, 602f and the pressure-variable chambers 601b, 602b and an atmospheric air valve 700 adapted to cut off and allow a communication between the pressure-variable chambers 601b, 602b and the outside. It should be noted here that the atmospheric air valve 700 and the vacuum valve 500 are axially spacedly constructed such that a small distance is formed therebetween. This is attributable to the fact that the valve body of the atmospheric air valve 700 and the valve body of the vacuum valve 500 are formed of separate members respectively. The valve body of the atmospheric air valve 700 is a member 710 which is opened at an area in the vicinity of the intermediate diameter portion 52m of the hub portion 52, while the valve body of the vacuum valve 500 is a rubber ring 510 at a front end of an inner member 800 which is fitted to the inner periphery of the intermediate diameter portion 52m of the hub portion 52.

The valve body 710 of the atmospheric air valve 700 is chiefly comprised of a cylindrical rubber. A rear end 712 of the valve body 710 is supported by the opening portion of the intermediate diameter portion 52m of the hub portion 52, while a front end 714 thereof is urged forwardly by a biasing force of the spring 730. For supporting the rear end 712 of the valve body 710, a stop ring 750 and a spring 755 are employed. In the illustrated example, since the rear end 712 to be supported is arranged to be continuous from the inner periphery of the cylindrical member 90 to the inner periphery of the intermediate diameter portion 52m, the rear end 712 can be supported in a reliable manner by utilizing the step formed on the opening portion of the intermediate diameter portion 52m. The rear end 712 is adapted to air-tightly seal the inner peripheries of the hub portion 52 and the cylindrical member 90. This is preferred also in view of obtaining a reliable sealing effect. On the other hand, a reinforcing ring 760 is provided on the front end 714 which serves as a valve portion. This ring 760 also serves as one of two spring retainers for retaining the spring 730. A spring retainer 770, which is provided on the input rod 210 side, also serves as the other spring retainer for retaining the spring 730 with respect to the front end 714 and the spring 755 with respect to the rear end 712.

The valve body 710 of the atmospheric air valve 700, in other words, the valve body of the front end 714, can sit on and leave away from a valve seat 780 located on the rear end of the valve plunger 220. The valve seat 780 accompanied by the valve body 710 constitutes the atmospheric air valve 700. The valve plunger 220 including the atmospheric air valve 780 is fitted at its front end portion to the inner periphery of the reduced diameter portion 52s of the hub portion 52 while being supported by the input rod 210. Owing to this arrangement, when the input rod 210 moves in the axial direction together with the valve plunger 220, the internal bore within the reduced diameter portion 52s serves to guide the valve plunger 220. Especially, by providing an outwardly faced flange 223 on the rear end of the valve plunger 220 and allowing its outer periphery portion to be served as the valve seat 780, the atmospheric air valve 700 is enlarged in diameter so that the area of a passage for allowing the atmospheric air to flow therein can be enlarged.

Figure 2:
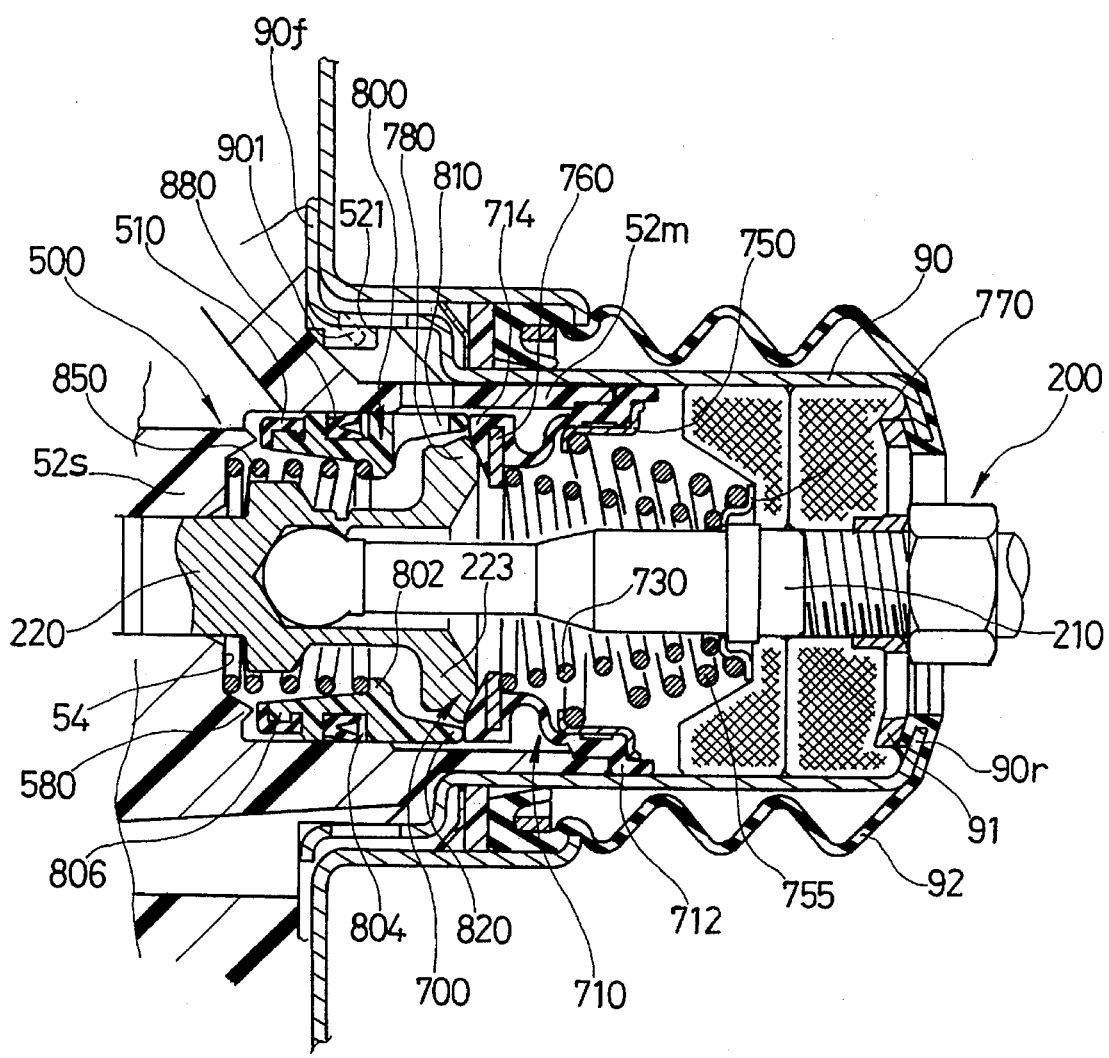
FIG. 2 is a partly enlarged view showing a portion around an internal bore in a hub portion of a servo piston.
Figure 3:
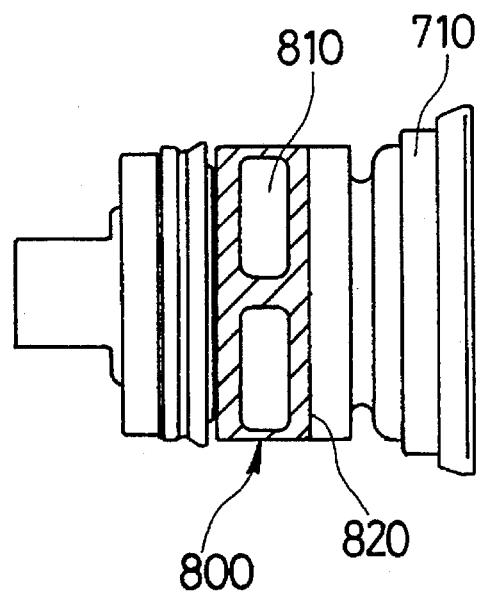
FIG. 3 is a view showing one example of slits formed in an inner member.
Figure 4:
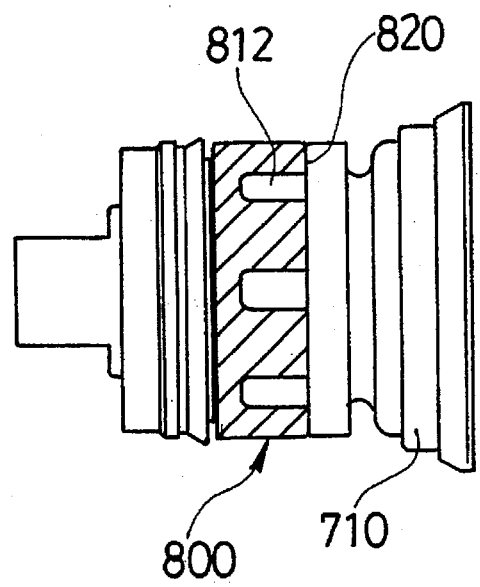
FIG. 4 is a view showing another example of slits formed in the inner member.

As shown in FIGS. 1 and 2, as well as in FIGS. 3 and 4, the inner member 800 itself including the valve body 510 of the vacuum valve 500 is in the form of a cylindrical configuration and has a plurality of slits circumferentially formed in its rear end. The slits are adapted to allow a communication between the inside and the outside of the cylindrical inner member 800. The slits may be in the form of closed bores 810 as shown in FIG. 3 or cut-outs 812 as shown in FIG. 4. The closed bores 810 are more preferred in view of less damage likely to occur to the valve body 710 when a rear end face 820 of the inner member 800 is brought into contact with the valve body 710 of the atmospheric air valve 700.

The inner member 800 includes a stepped portion 802 at an intermediate area on its inner periphery side, a groove 804 formed on its outer periphery side, and an irregular portion 806 formed on its front end and adapted to facilitate the attachment of the rubber ring 510. The stepped portion 802 on the inner periphery side is designed to serve as a spring retainer for retaining one end of a spring 850. The rear end of the reduced diameter portion 52s of the hub portion 52 is designed to serve as another spring retainer for retaining the other end of the spring 850. The stepped portion 54 is provided on its outer periphery portion with a projection 580 extending around a full circumference thereof and serving as the valve seat of the vacuum valve 500. The inner member 800 holding the rubber ring 510 on its front end causes the rear end face 820 to abut normally against the valve body 710 of the atmospheric air valve 700 under the biasing force of the spring 850. In that state, the rubber ring 510 (the valve body of the vacuum valve 500) on the front end side is in a position slightly away from the projection 580 acting as the vacuum valve seat. It is preset such that the biasing force of the spring 850 with respect to the inner member 800 is smaller than that of the inner and outer springs 730 and 755 on the side of the atmospheric air valve 700. The biasing force of those springs is set such that the biasing force of the spring 730 on the atmospheric air valve 700 side is larger than the biasing force of the spring 850 with respect to the inner member 800 and the biasing force of the spring 755 is larger than that of the spring 730. That is, the biasing force of the spring 730 is set to be smaller than that of the spring 755 in order to keep the vacuum valve 500 in its open position when the vacuum booster is in its inoperable position, and the biasing force of the spring 730 is set to be larger than that of the spring 850 in order to open the vacuum valve 500 when the booster is in operation.

The groove 804 on the outer periphery side of the inner member 800 is adapted to facilitate the attachment of a seal ring. A cup seal 880 is suitably installed in the groove 804. Since the cup seal 880 is smaller in sliding resistance than other seal rings, it enhances a smooth sliding motion of the inner member 800 and ensures a smooth operation of the valve. Since a substantially large force is not applied to the inner member 800 itself, the member 800 can be made of plastic or the like.

Operation of the vacuum booster 10, particularly the control valve unit including the atmospheric air valve 700 and the vacuum valve 500, will now be described.

When the booster is in its inoperable position as shown in FIGS. 1 and 2, the servo piston 50 is in its retracted position, the vacuum valve 500 is in its open position and the atmospheric air valve 700 is in its closed position. The servo piston 50 is stopped in a state that the rear end of the enlarged diameter portion 52b of the hub portion 52 is in abutment with the casing side. At that time, the cylindrical member 90 is in a position where the outwardly faced flange 90f on its front end is in abutment with the inner surface of the rearward wall 24. The cylindrical member 90 serves to restrict the retracted position of the input member 200 through an inwardly faced flange 90r and a nut 91. That is, the input member 20, which tends to retract under the effect of the biasing force of the spring 755, is brought to such a specific retracted position. Thus, the atmospheric air valve seat 780 integral with the input member 200 is also in a constant position where the front end 714 of the atmospheric air valve body 710 to be subjected to the biasing force of the spring 730 sits. The rear end face 820 of the inner member 800 to be subjected to the biasing force of the spring 850 is in abutment with the front end 714. The vacuum valve body 510 on the front end of the inner member 800, whose position is restricted by this, is slightly left away from the vacuum valve seat 580 on the hub portion 52 side. A gap (distance) between the valve seat 580 and the valve body 510 tends to result in an invalid stroke in the booster 10. Since the rear end of the inner member 800 integrally including the vacuum valve body 510 is normally caused to abut against the front end 714 of the atmospheric air valve body 710 by the spring 850, an invalid stroke accompanied by an operation is only the stroke caused by the gap (distance) between the valve seat 580 and the valve body 510.

When the input member 200 is moved forwardly from such an inoperable position as mentioned above by operating a pedal, not shown, the spring 850 is compressed by the biasing force of the spring 730, the vacuum valve body 510 on the front end of the inner member 800 reduces the distance and comes to sit on the vacuum valve seat 580 on the hub portion 52 side. At the same time, the atmospheric air valve 700 is brought into its open position. In response to such switching operations of the respective valves, an atmospheric air flows in through the gap between the valve body 714 of the atmospheric air valve 700 and the valve seat 780 to cause a pressure difference to act on the servo piston 50. At that time, since the diameter of the atmospheric air valve 700 is large, the area of the passage where the atmospheric air flows in is considerably large and responsibility is good. After the vacuum valve 500 is closed, the inner member 800 is not allowed to slide relative to the internal bore within the hub portion 52. Accordingly, no loss of output attributable to the sliding resistance tends to occur, either. A groove 521 is formed in the outer periphery of the intermediate diameter portion 52m of the hub portion 52, and an upwardly press-worked piece 901 from the cylindrical member 90 is inserted in the groove 521. The upwardly press-worked piece 901 and the groove 521 are cooperated with each other to restrict the relative moving range between the hub portion 52 and the valve plunger 220 side, that is, an opening rate of the valve is restricted. In this respect, the present invention is the same as the technique disclosed by Japanese Patent Application Laid-Open No. 109765/90.

In the vacuum booster 10, the inner member 800 including the valve body 510 of the vacuum valve 500 is slidingly moved towards the internal bore side of the hub portion 52. Accordingly, even in the case the valve plunger 220 is swung in accordance with the motion of the inner member 800 with the vacuum valve 500 held in its closed position, the swinging motion, unlike the technique disclosed by the above-mentioned Japanese Patent Publication No. 50695/82, will not give any adverse effect to the vacuum valve 500 and therefore, no vacuum leak tends to occur.

What is claimed is:

1. In a vacuum booster comprising a casing including a forward wall and a rearward wall axially separated with each other and having a cavity therein, a servo piston disposed within said casing and including a cylindrical hub portion along an axis and a pressure receiving portion extending from said hub portion in a direction perpendicular to the axis, said cavity being divided by said servo piston so as to define a vacuum chamber located on the side of said forward wall and a pressure-variable chamber located on the side of said rearward wall, an input member axially extending through said rearward wall, an external end portion of said input member located outside said casing being subjected to an operating force and an internal end portion, whose end portion is located within said casing, being inserted into an internal bore of said hub portion, an output member axially extending through said forward wall being faced with the internal end portion of said input member, and a control valve unit including a vacuum valve for allowing and cutting off a communication between said vacuum chamber and said pressure-variable chamber and an atmospheric air valve for cutting off and allowing a communication between said pressure-variable chamber and the atmospheric air, in response to motion of said input member in the axial direction, said vacuum booster having the following features with respect to said atmospheric air valve and said vacuum valve of said control valve unit:

(A) valve bodies of said atmospheric air valve and said vacuum valve are formed of separated members, respectively, (B) said atmospheric air valve comprises said atmospheric air valve body which is supported at one end portion thereof by an inner periphery side of the internal bore in said hub portion of said servo piston and which is subjected at the other end to a spring force directing from said input member side towards said output member side, and an atmospheric air valve seat disposed on an inner end portion of said input member, (C) a cylindrical inner member is air-tightly and slidably fitted in the internal bore of said hub member, (D) said vacuum valve comprises said vacuum valve body disposed on a front end of said inner member and a vacuum valve seat disposed on the internal bore side of said hub member, and (E) said inner member is under the effect of a spring force directing from said output member side towards said input member side and a rear end thereof is in abutment with said atmospheric air valve body of said atmospheric air valve.

2. A vacuum booster according to claim 1, wherein said inner member surrounds an outer periphery of said valve plunger.

3. A vacuum booster according to claim 1, wherein said input member comprises an input rod and a valve plunger jointed to a front end of said input rod by a ball joint, an outwardly-faced flange is disposed on a rear end of said valve plunger and said atmospheric air valve seat is disposed on an outer periphery portion of said outwardly-faced flange.

4. A vacuum booster according to claim 1, wherein the internal bore in said hub portion is in the form of a stepped bore having a stepped portion at an intermediate portion thereof, and said vacuum valve seat is disposed on said stepped portion and said stepped portion also serves as one of a pair of spring retainers for retaining said spring for exerting a spring force to said inner member.

5. A vacuum booster according to claim 4, wherein the other spring retainer for exerting a spring force to said inner member is a stepped portion on an inner periphery of said inner member.

6. A vacuum booster according to claim 1, wherein said inner member has a plurality of slits formed in the rear end thereof, said slits being adapted to allow a communication between an outside and an inside of a cylindrical periphery of said inner member.

7. A vacuum booster according to claim 6, wherein said slits are in the form of closed bores and a rear end face of said inner member, which is in abutment with said atmospheric air valve body of said atmospheric air valve, is continuous over the entire periphery.

8. A vacuum booster according to claim 1, wherein a seal member is interposed between an outer periphery of said inner member and the internal bore in said servo piston.

9. A vacuum booster according to claim 8, wherein said seal member is constituted of a cup seal.

10. A vacuum booster according to claim 1, wherein said inner member is made of plastic.

* * * * *